United States Patent
Tsuchiya et al.

(10) Patent No.: US 7,196,883 B2
(45) Date of Patent: Mar. 27, 2007

(54) SUPERCONDUCTING MAGNET SYSTEM WITH QUENCH PROTECTION CIRCUIT

(75) Inventors: Mitsuyoshi Tsuchiya, Hitachi (JP); Kazuhiro Takeuchi, Hitachi (JP); Hideo Tsukamoto, Hitachi (JP); Tsuyoshi Wakuda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/443,291

(22) Filed: May 31, 2006

(65) Prior Publication Data

US 2006/0227471 A1  Oct. 12, 2006

Related U.S. Application Data

(63) Continuation of application No. 11/214,862, filed on Aug. 31, 2005.

(30) Foreign Application Priority Data

Aug. 31, 2004  (JP) .............................. 2004-251679

(51) Int. Cl.
*H02H 7/00* (2006.01)
(52) U.S. Cl. ........................................ 361/19; 361/141
(58) Field of Classification Search .................... 361/19
See application file for complete search history.

(56) References Cited

U.S. PATENT DOCUMENTS

| 4,689,707 | A | 8/1987 | Schwall |
| 5,650,903 | A | 7/1997 | Gross |
| 6,147,844 | A | 11/2000 | Huang |
| 2005/0231859 | A1 | 10/2005 | Huang |

FOREIGN PATENT DOCUMENTS

JP  7-27815  3/1995

*Primary Examiner*—Ramon M. Barrera
(74) *Attorney, Agent, or Firm*—Antonelli, Terry, Stout and Kraus, LLP.

(57) ABSTRACT

A superconducting magnet system with a quench protection circuit includes a superconducting magnet having a plurality of series-connected superconducting coils, a persistent current switch connected in parallel with the superconducting coils, and first and second quench protection circuits connected in parallel with the superconducting coils and the persistent current switch. The first quench protection circuit includes anti-parallel diodes and parallelly connected resistive heaters and shunt resistors, and the resistive heaters and the shunt resistors are each connected in series with the diodes. The second quench protection circuit has a diode and a metal of copper connected with the diode, and a turn-on voltage of the diode in the second quench protection circuit is lower than a turn-on voltage of the diodes in the first quench protection circuit.

6 Claims, 4 Drawing Sheets

SUPERCONDUCTING MAGNET SYSTEM WITH QUENCH PROTECTION CIRCUIT

CROSS REFERENCE TO RELATED APPLICATION

This application is a continuation of U.S. application Ser. No. 11/214,862, filed Aug. 31, 2005, the contentions of which are incorporated herein by reference.

BACKGROUND OF THE INVENTION

The present invention relates to a superconducting magnet system which has a superconducting coil and a persistent current switch and more particularly to a superconducting magnet system which has quench protection circuits for the superconducting coil and the persistent current switch.

Superconducting coils capable of flowing a large current are often used in magnets required to generate strong magnetic fields, as in NMR (nuclear magnetic resonance) equipment. To use superconducting coils to generate strong magnetic fields that are stable at all times requires flowing an electric current in a persistent current mode. To establish the persistent current mode, a persistent current switch (PCS) is connected in parallel with the superconducting coils.

The superconducting coils, however, have a problem of quench. In the event of a quench, if a protection circuit is not provided, energy stored in the superconducting coils is all consumed by the superconducting coils themselves that have transitioned to a normal conducting state. As a result, the superconducting coils may be burned out or their composition change. Further, since the persistent current switch is also a superconducting device, it must be provided with a protection circuit to protect against quenches, as with the superconducting coils. Therefore, superconducting magnets need to be connected with quench protection circuits.

FIG. 4 shows one example of superconducting magnet circuits made up of superconducting coils, persistent current switches and quench protection circuits. Three series-connected superconducting coils 10, 12, 14, a persistent current switch 16 and a protective resistor 18 are parallelly connected. These are also connected in parallel with a power supply (not shown) through current leads 20, 22 for excitation and deexcitation. This magnet circuit also has a persistent current switch 24 for commutation, a heater drive circuit 26 for the persistent current switch, and resistive heaters 28, 30, 32.

In the circuit shown in FIG. 4, in the event that the superconducting coils 10 to 14 quench, the energy stored in these coils is mostly consumed by the protective resistor 18 by making the resistance of the protective resistor 18 sufficiently smaller than the off-state resistance of the superconducting coils 10 to 14. Also, when the persistent current switch 16 quenches, most of the energy is consumed by the protective resistor 18 by making the off-state resistance of the persistent current switch 16 sufficiently larger than the resistance of the protective resistor 18.

If the off-state resistance of the persistent current switch 16 is large, a time constant during deexcitation becomes large, which means that it takes longer for deexcitation. In addition, the current flows through both the persistent current switch 16 and the protective resistor 18. This increases the amount of heat produced, so a diode or thyristor is being considered in place of the protective resistor. These techniques are described in JP-A-7-27815.

SUMMARY OF THE INVENTION

The method of using a diode or thyristor in the quench protection circuit can not only improve the quench protection performance but reduce heat losses during excitation and deexcitation. However, the equipment disclosed in JP-A-7-27815 does not consider protecting the superconducting coils and the persistent current switch independently and passively. Therefore, the equipment requires a detection device for quench detection and also has problems, such as a possibility of superconducting coils being burned in the event of a failure of the protective heater drive device, and a complicated design.

An object of this invention is to provide an easy-to-design quench protection circuit which has improved ease of use and reliability.

To meet the above requirement, this invention provides a superconducting magnet system with a quench protection circuit, which comprises: a superconducting magnet having a superconducting coil; a persistent current switch connected in parallel with the superconducting coil to cause a persistent electric current to flow through the superconducting coil; and first and second quench protection circuits connected in parallel with the superconducting coil and the persistent current switch, respectively; wherein the first quench protection circuit comprises anti-parallel diodes and a parallelly connected resistive heater and shunt resistor, and the resistive heater and the shunt resistor are each connected in series with the diodes; wherein the second quench protection circuit has a diode connected in parallel with the persistent current switch; wherein the shunt resistor and the resistive heater protect the superconducting coil in the event of a quench, and the resistive heater has a function of heating adjoining superconducting coil; wherein a turn-on voltage of the diode in the second quench protection circuit is lower than those of the diodes in the first quench protection circuit.

By making the shunt resistors in the superconducting coil protection circuit function as resistive heaters to heat the adjoining coils, the superconducting coils can be protected passively and reliably. Further, an independent quench protection for individual superconducting coils can be designed and executed by differentiating forward voltages of the diodes.

In the quench protection circuit of this invention, the superconducting coil and the persistent current switch can be protected passively and independently of each other.

Other objects, features and advantages of the invention will become apparent from the following description of the embodiments of the invention taken in conjunction with the accompanying drawings.

DETAILED DESCRIPTION OF THE EMBODIMENTS

Embodiment 1

Figure 1:
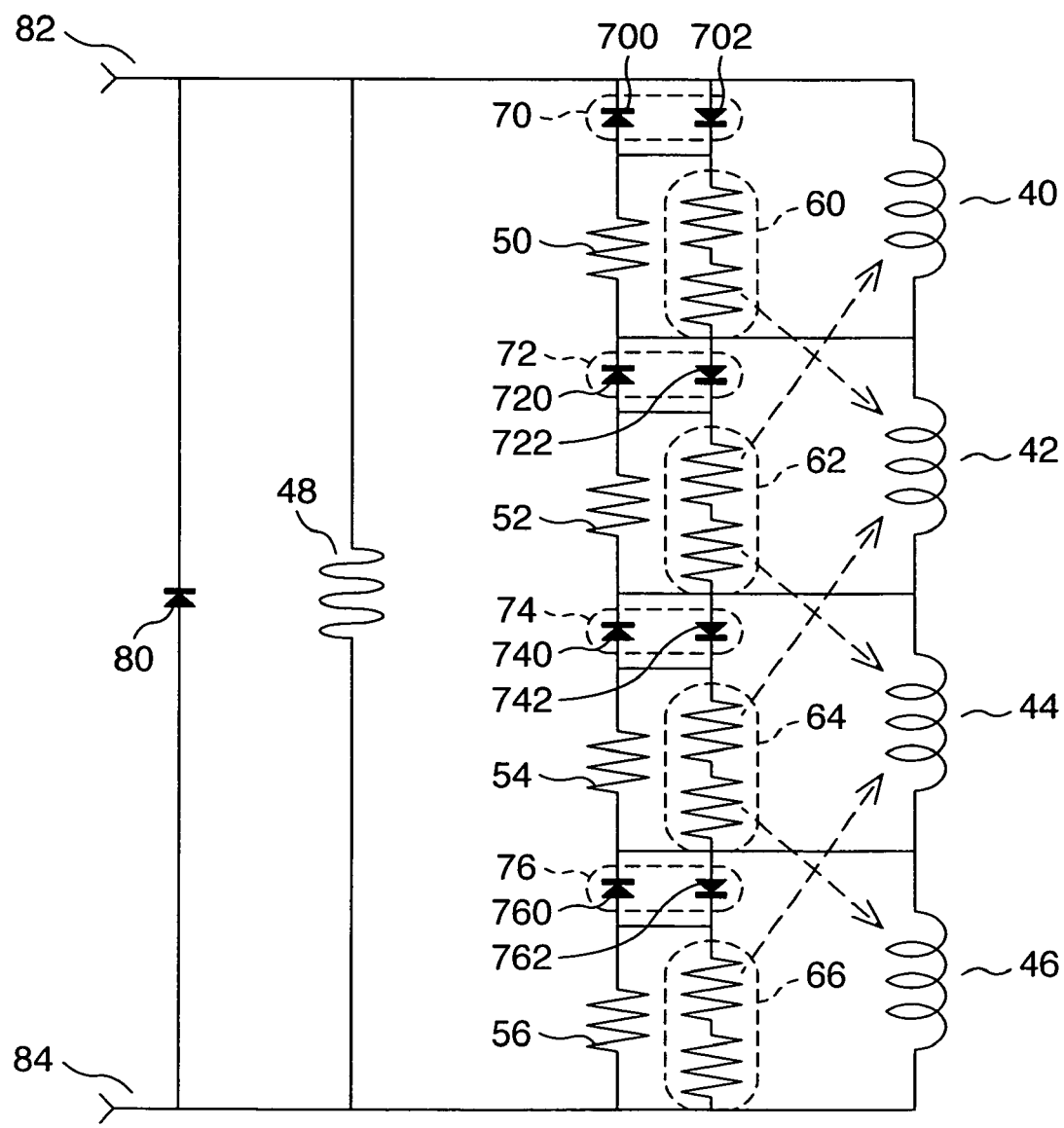
FIG. 1 shows a circuitry as one embodiment of this invention, in which a passive protection circuit using diodes and resistive heaters is applied to superconducting coils and in which a protection circuit using a diode is applied to a persistent current switch.

FIG. 1 shows a circuitry as one embodiment of this invention. This is a protection circuit for a multilayer coil made up of four coils and for a persistent current switch. Series-connected four superconducting coils 40, 42, 44, 46 and a persistent current switch 48 are connected in parallel, forming a main circuit. Shunt resistors 50, 52, 54, 56 are connected in parallel with the associated superconducting coils 40 to 46 to form divided protection circuits.

Resistive heaters 60, 62, 64, 66 are each made up of two unit heaters 600, 602, 620, 622, 640, 642, 660, 662 that are matched to the adjoining superconducting coils 40 to 46 as indicated by dashed arrows. That is, unit heater resistors 620, 622 connected in series with each other to form the heater resistor 62 heat different superconducting coils 40, 44 located nearby as indicated by dashed arrows. Other heater resistors 60, 64, 66 are also arranged in a similar manner to the heater resistor 62.

Diode pairs 70, 72, 74, 76 are connected in series with the shunt resistors 50 to 56 and with the resistive heaters 60, 62, 64, 66. Each of the diode pairs 70 to 76 is made up of anti-parallelly connected diodes 700, 702, 720, 722, 740, 742, 760, 762. A diode 80 is connected in parallel with the persistent current switch 48 for its protection. A turn-on voltage of the diode 80 is selected to be lower than those of the diode pairs 70 to 76. The turn-on voltage refers to a forward voltage that appears across the diode during conduction. Though not shown in the figure, these devices are installed in a vessel kept at cryogenic temperatures.

During the steady state operation of the superconducting coils 40 to 46, electric current flows through a circuit made up of the persistent current switch 48 and superconducting coils 40 to 46 but not through the shunt resistors 50 to 56, resistive heaters 60 to 66 and diode 80. At the start and end of the operation, i.e., when the superconducting coils 40 to 46 are excited or deexcited, connecting current leads 82, 84 to a power supply to apply a voltage across the superconducting coils 40 to 46 produces a voltage between terminals of each of the superconducting coils 40 to 46.

In a superconducting coil for a NMR device, this voltage is normally set at around several volts according to the size of the superconducting coils 40 to 46. Diodes 700 to 762 used for the diode pairs 70 to 76 have their forward voltage set at about 0.5 to 1.0 volts for each diode. If necessary, two or more unit diodes may be connected in series to prevent current from flowing in the shunt resistors 50 to 56, resistive heaters 60, 62, 64, 66 and persistent current switch protection diode 80 even when a voltage is produced when the superconducting coils are excited or deexcited.

When one of the superconducting coils quenches, a voltage far exceeding the forward voltage of the diode is generated in that quenched coil and therefore a current flows through the shunt resistors and resistive heaters. However, the persistent current switch 48 stays in the superconducting state, almost free from any adverse effect of the quenched superconducting coil. If the persistent current switch 48 should quench, the energy accumulated in the superconducting coils can be recovered by the persistent current switch protection circuit while keeping the superconducting coils in the superconducting state, by designing the forward voltage of the persistent current switch protection diode to be lower than those of the superconducting coils. Further, by connecting the persistent current switch protection diode to a metal with a large heat capacity such as copper, it is also possible to recover a greater stored energy.

With this embodiment, a passive protection circuit requiring no quench detection can be realized. Further, because the adjoining coils can be quenched successively by the heating of the heaters, it is possible to prevent excessive electromagnetic forces caused by excessive current increase and high temperatures and high voltages caused by overheating. This embodiment can also realize a persistent current switch protection circuit independent of the superconducting coil protection circuit.

Embodiment 2

Figure 2:
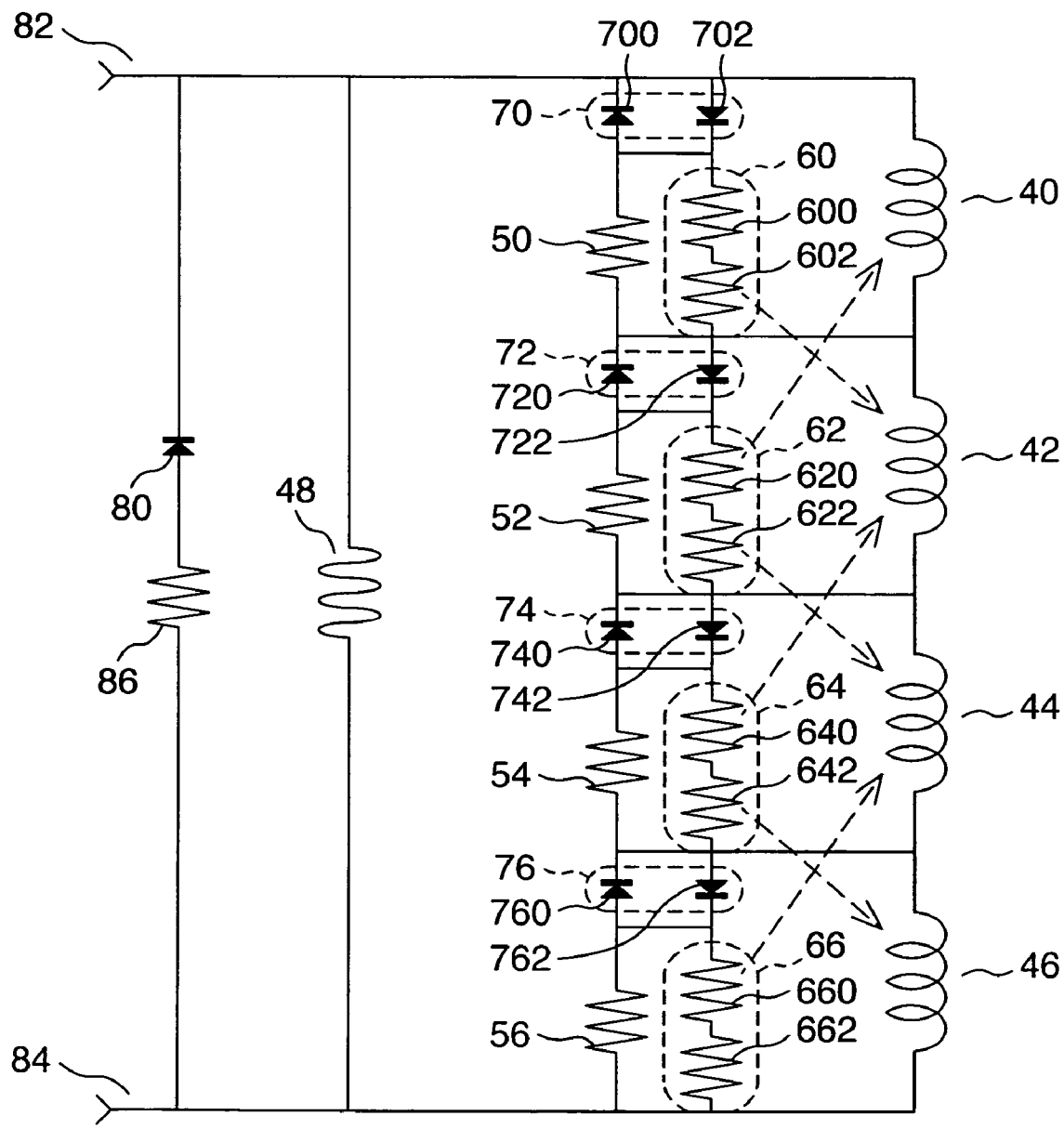
FIG. 2 shows a protection circuit as another embodiment of this invention, in which a resistor is connected in series with a persistent current switch protection diode.

FIG. 2 shows a protection resistor 86 connected in series with the diode 80 applied to the protection circuit of the persistent current switch 2 in the circuit of FIG. 1. Like reference numbers denote the identical components of FIG. 1 and their explanations are omitted. While in FIG. 1 the energy stored in the persistent current circuit is recovered by the diode 80 in the event of the quench of the persistent current switch 48, this embodiment can recover the energy by the resistor 86 in addition to the diode 80. It is therefore possible to recover a greater amount of energy in a shorter period of time.

Embodiment 3

Figure 3:
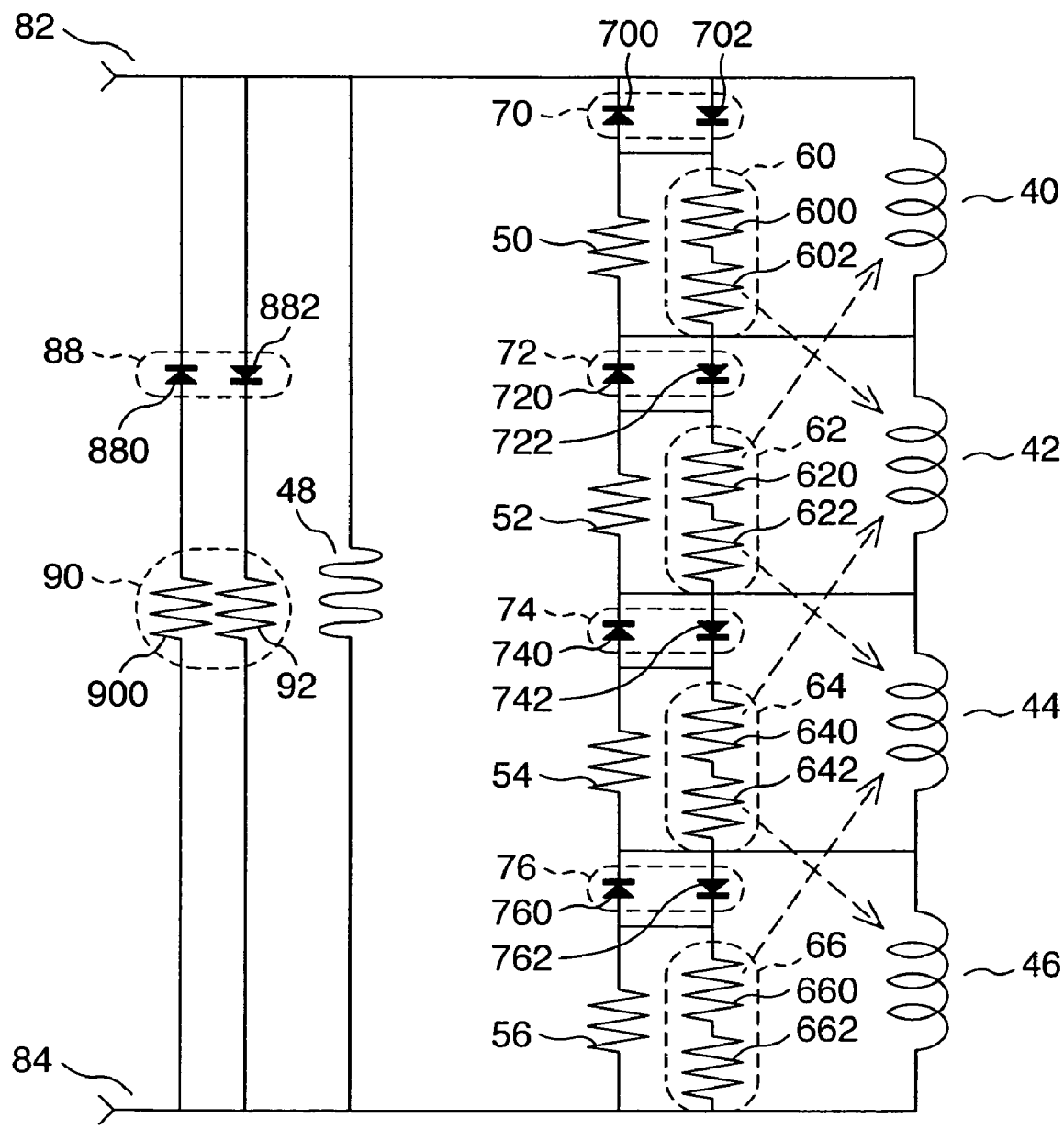
FIG. 3 shows a circuitry as still another embodiment of this invention, in which a protection circuit using a bidirectional diode is applied to a persistent current switch.
Figure 4:
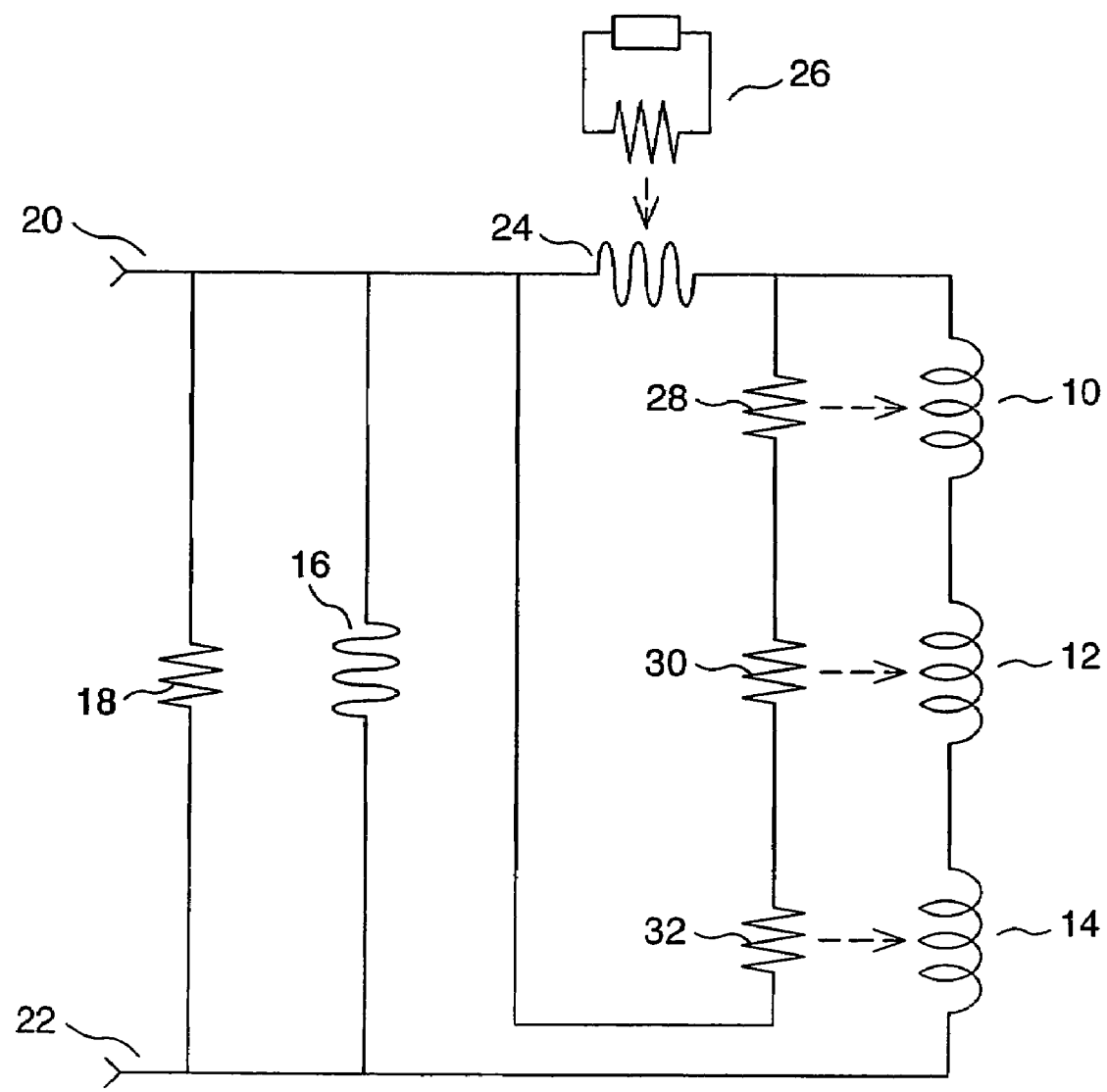
FIG. 4 shows a conventional active protection circuit using a commutation switch and a protective resistor.

FIG. 3 is a circuitry in which the diode 80 applied to the protection circuit of the persistent current switch 48 in FIG. 1 is replaced with a bidirectional diode 88 made up of unit diodes 880, 882. Like reference numerals denote the identical components of FIG. 1 and their explanations are omitted. The provision of the bidirectional diode 88 in this embodiment obviates the need to consider the polarity at time of excitation and deexcitation and thereby improves the ease of use. When the energy to be recovered is large or the time to recover the energy is reduced, protective resistors 90, 92 may be connected in series with the bidirectional diode 88 as in the embodiment 2 of FIG. 2.

Since this invention can realize easy-to-design protection circuits with high level of safety for superconducting coils and for a persistent current switch, it can be applied to NMR (nuclear magnetic resonance) and MRI (magnetic resonance imaging) equipment made up of a plurality of superconducting coils which are operated for a long period of time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A superconducting magnet system with a quench protection circuit, comprising:
    a superconducting magnet having a plurality of series-connected superconducting coils;
    a persistent current switch connected in parallel with the superconducting coils; and
    first and second quench protection circuits connected in parallel with the superconducting coils and the persistent current switch;
    wherein the first quench protection circuit comprises anti-parallel diodes and parallelly connected resistive heaters and shunt resistors, and the resistive heaters and the shunt resistors are each connected in series with the diodes;

wherein the second quench protection circuit has a diode and a metal of copper connected with the diode; and wherein a turn-on voltage of the diode in the second quench protection circuit is lower than a turn-on voltage of the diodes in the first quench protection circuit.

2. A superconducting magnet system with a quench protection circuit, according to claim 1, wherein the superconducting magnet has a superconducting coil group made up of a plurality of superconducting coils electrically connected in series, and wherein the quench protection circuit is connected in parallel with each of the superconducting coils.

3. A superconducting magnet system with a quench protection circuit, according to claim 1, wherein the diodes in the first and second quench protection circuits are constructed of different numbers of unit diodes electrically connected in series, the unit diodes having almost equal withstand voltages.

4. A superconducting magnet system with a quench protection circuit, according to claim 1, wherein at least one of the diodes in the first and second quench protection circuits is electrically connected in series with a protective resistor.

5. A superconducting magnet system with a quench protection circuit, according to claim 1, wherein the diodes in the first and second quench protection circuits have thyristors instead of the diodes.

6. A superconducting magnet system with a quench protection circuit, according to claim 1, wherein unit heater resistors connected in series to form each of the resistive heaters heat the adjoining, different superconducting coils.

* * * * *